United States Patent [19]

Delion et al.

[11] Patent Number: 5,817,898
[45] Date of Patent: Oct. 6, 1998

[54] PROCESS FOR INHIBITING OR RETARDING THE FORMATION, GROWTH AND/OR AGGREGATION OF HYDRATES IN PRODUCTION EFFLUENTS

[75] Inventors: Anne Sophie Delion, Paris; Jean Pierre Durand, Chatou; Patrick Gateau, Maurepas; Marie Velly, Paris, all of France

[73] Assignee: Institut Francais du Petrole, France

[21] Appl. No.: 638,965

[22] Filed: Apr. 25, 1996

[30] Foreign Application Priority Data

Apr. 26, 1995 [FR] France ................................. 95 05099

[51] Int. Cl.$^6$ ................................. C07C 7/20; C10G 9/16
[52] U.S. Cl. ................................. 585/15; 585/5; 585/950; 95/153; 137/13; 166/310; 208/48 AA
[58] Field of Search ................................. 585/15, 950, 5; 95/153; 137/13; 166/310; 208/48 AA

[56] References Cited

U.S. PATENT DOCUMENTS 4,973,775 11/1990 Sugier et al. ............................. 585/15

FOREIGN PATENT DOCUMENTS 0 323 774  7/1989  European Pat. Off. .
0 582 507  2/1994  European Pat. Off. .
0 594 479  4/1994  European Pat. Off. .

*Primary Examiner*—Glenn Caldarola
*Assistant Examiner*—In Suk Bullock
*Attorney, Agent, or Firm*—Mullen, White, Zelano & Branigan, P.C.

[57] ABSTRACT

A process is described for retarding or inhibiting the growth and/or aggregation of hydrates in production effluents comprising water and a gas under thermodynamic conditions in which hydrates can form, characterized in that a low concentration (0.05% to 5% by weight with respect to the water) of water-soluble copolymer containing hydrophobic groups is incorporated into the effluent.

32 Claims, No Drawings

PROCESS FOR INHIBITING OR RETARDING THE FORMATION, GROWTH AND/OR AGGREGATION OF HYDRATES IN PRODUCTION EFFLUENTS

FIELD OF THE INVENTION

The invention concerns a process for inhibiting or retarding the formation, growth and/or aggregation of hydrates of natural gas, petroleum gas or other gases, by means of at least one additive. Gases which form hydrates can in particular comprise at least one hydrocarbon selected from methane, ethane, ethylene, propane, propene, n-butane and isobutane, and possibly $H_2S$ and/or $CO_2$.

Such hydrates form when water comes into the presence of a gas, either in its free state or dissolved in a liquid phase such as a liquid hydrocarbon, and when the temperature reached by the mixture, in particular water, gas and any liquid hydrocarbons such as oil, drops below the thermodynamic temperature for hydrate formation, this temperature being given for a known gas composition at a fixed pressure.

BACKGROUND OF THE INVENTION

Hydrate formation is a problem, particularly in the petroleum and gas industries, where the conditions for hydrate formation can be satisfied. One route which has been explored for reducing the exploitation and investment costs of crude petroleum and gas production, particularly for offshore production, is to reduce or remove the treatments applied to crude or gas to be transported from the field to the coast, in particular to leave all or part of the water in the fluid to be transported. These offshore treatments are normally carried out on a platform located on the surface close to a field, so that the effluent (which is initially hot) can be treated before the thermodynamic conditions for hydrate formation are reached when the effluent is cooled with seawater.

In practice, however, when the thermodynamic conditions for hydrate formation are satisfied, aggregation of the hydrates causes the transporting lines to block by the creation of plugs which prevent the passage of crude petroleum or gas.

The formation of hydrate plugs can result in production stoppage and thus cause large financial losses. Further, restarting the facility, especially an offshore production or transport facility, can be a long process as it is very difficult to decompose the hydrates which form. When production of a submarine field for natural gas or petroleum and gas containing water reaches the surface of the sea bed and is transported on the sea bed, a reduction of the temperature of the effluent can result in the thermodynamic conditions being satisfied leading to hydrate formation, which can aggregate and block the transfer lines. The temperature on the sea bed can, for example, be 3° C. or 4° C.

Favourable conditions for the formation of hydrates can also occur onshore in lines which are not buried (or not deeply buried) in the ground, for example when the ambient air is cold.

To overcome these problems, products have been proposed in the prior art which, when added to the fluid, can act as inhibitors by reducing the thermodynamic temperature for hydrate formation. In particular, these are alcohols such as methanol, or glycols such as mono-, di- or triethyleneglycol. That solution is very expensive since the quantity of inhibitors to be added can be as high as 10% to 40% of the water content and such inhibitors are difficult to recover completely.

The insulation of transport lines has also been proposed to prevent the temperature of the transported fluid reaching the temperature of hydrate formation under the operating conditions. Again, this technique is very expensive.

The use of additives which can modify the hydrate formation mechanism has also been proposed, in which instead of aggregating rapidly together to form plugs, the hydrates formed disperse in the fluid without aggregating and without obstructing the lines. The following can be cited in this respect: our European patent application EP-A-0 323 774, which describes the use of amphiphilic non-ionic compounds selected from polyol esters and carboxylic acid esters, which may or may not be substituted, and compounds containing an imide function; our patent application EP-A-0 323 775 which in particular describes the use of diethanolamides of fatty acids or fatty acid derivatives; U.S. Pat. No. 4,956,593 which describes the use of surfactants such as organic phosphates, phosphate esters, phosphonic acids and their salts and esters, inorganic polyphosphates and their esters, and polyacrylamides and polyacrylates; and European application EP-A-0 457 375 which describes the use of anionic surfactants, such as alkylarylsulphonic acids, and their alkali metal salts.

Amphiphilic compounds, obtained by reacting at least one succinic derivative selected from the group formed by polyalkenylsuccinic acids and anhydrides with at least one polyethyleneglycol monoether, have also been suggested to reduce the tendency of hydrates of natural gas, petroleum gas or other gases (application EP-A-0 582 507) to aggregate.

The use of additives which can inhibit or retard the formation and/or growth of hydrates has also been recommended. In this respect, the following can be cited: EP-A-0 536 950, which describes the use of tyrosine derivatives, and International application WO-A-9325798, which describes the use of polymers and copolymers of N-vinyl-2-pyrrolidone and their mixtures.

SUMMARY OF THE INVENTION

We have now discovered that water-soluble copolymers containing hydrophlic units and hydrophobic units can, at low concentrations, inhibit or retard the formation, growth and/or aggregation of hydrates of natural gas, petroleum gas or other gases.

Thus the invention provides a process for inhibiting or retarding the formation, growth and/or aggregation of hydrates in a fluid comprising water and a gas under conditions where hydrates can form, (from the water and gas), characterized in that at least one water-soluble copolymer containing hydrophilic units (Hy) and hydrophobic units (Hb) is incorporated into the fluid, the hydrophobic units representing 0.5% to 70% by weight.

The water-soluble copolymers considered in the present invention can have the structure (I) below, which is of the type:

$$\text{Hb—A—hydrophilic chain Hy—A—Hb} \qquad (I)$$

In structure (I), the hydrophilic chain (Hy) is constituted by a polyoxyalkylene chain which has the following overall formula:

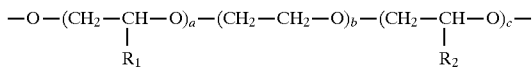

where $R_1$ and $R_2$ each represent a hydrogen atom or an alkyl radical containing 1 to 30 carbon atoms; a and c can each take a value of 0 to 50, b is less than or equal to 750, with (a+b+c) being non zero and b being sufficiently high for the copolymer to be water-soluble. By way of example, the ethylene oxide content in these copolymers (linked to the value of b) will be, for example, more than about 20% by weight.

The hydrophobic groups (Hb) are each an alkyl radical containing 2 to 30 carbon atoms, a cycloalkyl radical containing 6 to 30 carbon atoms, or a phenyl radical which may be substituted with one, two or three alkyl radicals containing 1 to 30 carbon atoms.

The A group connecting the hydrophobic groups (Hb) to the hydrophilic chain (Hy) can be defined as containing at least one urethane function, the groups thus having the following form, for example:

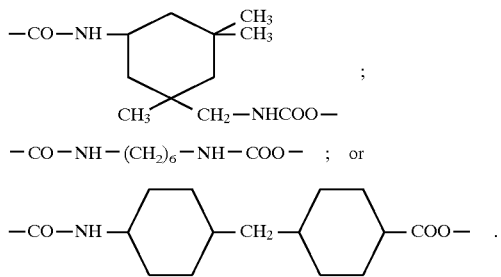

The copolymers with structure (I) defined above can, for example, be obtained by modifying a polyoxyalkylene with a diisocyanate, followed by modification of the product obtained with an alkylphenol.

A second structure for the copolymers of the invention is structure (II) defined below as a copolymer of the type (Hb)—(Hy) with a statistical distribution of hydrophilic and hydrophobic units, in which the hydrophilic units (Hy) have the general formula:

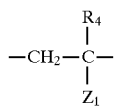

where $R_4$ represents a hydrogen atom or a methyl radical and $Z_1$ represents a —$CONH_2$ group; and the hydrophobic units (Hb) have the general formula:

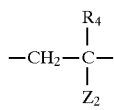

where $R_4$ represents a hydrogen atom or a methyl radical, $Z_2$ represents a COO $R'_1$, CONHR$'_1$, or CONR$'_1$R$'_2$, where R$'_1$ and R$'_2$ each represent an alkyl radical containing 2 to 30 carbon atoms, or an aryl or alkylaryl group containing 6 to 30 carbon atoms.

The copolymers with structure (II) are usually derived from hydrophilic monomer selected from acrylamide and methacrylamide, and a hydrophobic monomer selected from alkyl acrylates and methacrylates and substituted N-alkyl or N,N-dialkyl acrylamides or methacrylamides.

The copolymers with structure (II) described above can have an average molecular weight of 10,000 to 10,000,000.

The copolymers of the invention can also have structure (III) defined below as having type (Hb)—(Hy) with a statistical distribution of hydrophilic and hydrophobic units and with the following general formula:

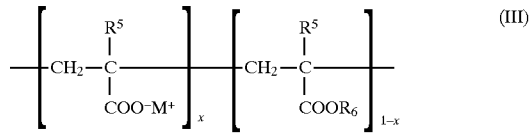

where $R_5$ represents a hydrogen atom or a methyl radical, $M^+$ represents a proton $H^-$ or an alkaline or ammonium cation, $R_6$ is an alkyl radical containing 2 to 6 carbon atoms and x is, for example, 0.4 to 0.8.

These copolymers can be formed by radical polymerisation of ethylenic monomers (meth)acrylic acid/alkyl (meth) acrylate in suitable proportions, the (meth) acrylic acid possible being neutralised with an alkaline hydroxide or ammonia.

The copolymers with structures (II) and (III) are prepared using known radical copolymerisation processes, in solution, as an emulsion, or in suspe nsion, of a mixture of the above monomers, in the presence of the usual catalytic systems for this type of polymerisation, and optionally in the presence of chain-transfer agents.

The molecular weight of the copolymer is adjusted by conventional means such as: temperature, amount of catalyst, the presence of a chain-transfer agent or any other means or combination of means known to the skilled person, and is between 10,000 and $10 \times 10^6$ (mass average molecular weight).

Finally, the water-soluble copolymers containing hydrophilic and hydrophobic units of the invention can have structure (IV) of the type (Hb)—(Hy) with a statistical distribution of hydrophilic and hydrophobic units and in which the hydrophobic units (Hy) have the following general formula:

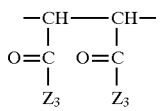

where $Z_3$ represents an OH group or a monomeric polyoxyalkylene chain —O—$(CH_2$—$CH_2$—$O)_m CH_3$ where m is 6 to 10 and the hydrophobic units (Hb) have at least one of the following general formulae:

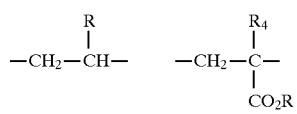

where R represents an alkyl radical containing 1 to 30 carbon atoms and $R_4$ is as defined above.

In general, the water-soluble copolymers containing hydrophilic and hydrophobic units of the invention are in the form of aqueous alkaline solutions such that the carboxylic acid functions present are neutralised.

In the process of the invention, the copolymers described are added to the fluid to be treated in concentration of, in general, 0.05% to 5% by weight, preferably 0.1% to 2% by weight, with respect to the water.

The invention will be better understood from the following non-limiting tests carried out in the presence of THF hydrates (Example 1) and methane hydrates (Examples 2 to 6).

The copolymers tested in the Examples are defined below:

Copolymer H1

Copolymer H1 had structure (I) described above and the following formulation:

hydrophilic portion: $(CH_2—CH_2—O)_b$ with b about 600;
hydrophobic portion: nonylphenyl with formula $C_9H_{19}—C_6H_4—$;
urethane portion connecting Hb to Hy:

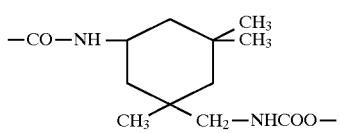

The mass average molecular weight of this polymer was about 30000.

Copolymer H2

H2 was an acrylic acid/nonyl methacrylate copolymer containing about 1% by weight of nonyl acrylate and had the following general formula:

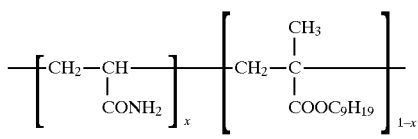

x thus had the value 0.99.

The mass average molecular weight of this copolymer was about $8×10^6$.

Copolymer H3

H3 was an acrylic acid/butyl acrylate copolymer containing about 45% by weight of butyl acrylate and had the following general formula:

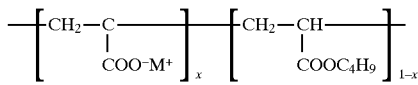

x thus had the value 0.55.

The mass average molecular weight of copolymer H3 was about $8×10^6$.

Copolymer H4

The copolymer with structure H4 contained partially esterified carboxylic anhydride units in which the hydrophilic ester groups were polyoxyethylene type units and the hydrophobic side chain units had the following two formulae respectively:

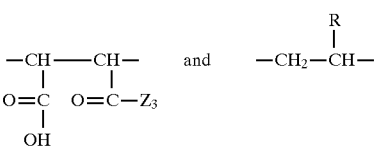

where R was an alkyl chain containing 12 to 14 carbon atoms and $Z_3$ was $—O—(CH_2—CH_2—O)_m—CH_3$, m being 6 to 10.

The mass average molecular weight was about 20000.

EXAMPLE 1

In order to simplify the experimental procedure for pre-selection of the additives, the first tests were carried out in the presence of hydrates of THF. A solution containing 20% by weight of THF forms hydrates at atmospheric pressure at 4° C.

The apparatus used was constituted by 16 mm diameter tubes into which 8 ml of an aqueous solution containing 20% by weight of THF and possibly containing the additive to be tested was introduced. A stainless steel 8 mm diameter ball was introduced into each tube to inhibit hydrate formation. The tubes were placed on a rotary agitator which turned at 20 revolutions/min. This latter was placed in a refrigerated chamber at 1° C.

The principle of this test was to determine the latency time preceding hydrate formation and the time taken after hydrate formation to block the ball introduced into the tube, simulating the formation of a plug. The latency time corresponded to the time measured between the moment when the tubes were introduced into the refrigerated chamber and the moment when hydrate formation was observed (appearance of cloudiness).

Each series of tests was conducted by comparing with a reference mixture which contained no additive, and the latency time and blocking times for an additive corresponded to the average of the times measured over six tests.

Addition of 0.5% by weight of copolymers containing hydrophilic and hydrophobic units of the invention produced, under the operating conditions used, a large increase in the latency time preceding hydrate formation. The results, shown in Table I demonstrate the inhibiting effect of the additives tested:

TABLE 1

| Inhibitor | Concentration % by weight with respect to water | Molecular weight | *Latency time (minutes) | Blocking time (minutes) |
|---|---|---|---|---|
| Deionised water | — | — | 39 | 58 |
| H1 | 0.5 | $27 × 10^3$ | 160 | 185 |
| H2 | 0.5 | $8 × 10^6$ | 270 | 295 |
| H3 | 0.5 | $8 × 10^6$ | >420 | >420 |
| H4 | 0.5 | $20 × 10^3$ | 220 | 250 |

*average of 6 tests.

EXAMPLE 2 (comparative)

Different additives which were outside the scope of the invention were tested for comparative purposes under the conditions described above:

polyvinylpyrrolidone (molecular weight 10000 to 70000; 0.5% by weight);

L-tyrosine (300 ppm);

Phenylalanine (300 ppm);

Polyacrylamide (molecular weight: 8 M; 0.5% by weight);

Polyacrylic acid (molecular weight: 5000; 0.5% by weight);

Carboxymethyl cellulose (0.5% by weight).

None of the additives used notable increased the induction times preceding hydrate formation or the blocking time for the ball present in the tubes under the test conditions used.

EXAMPLES 3 to 7

In order to test the effectiveness of the products used in the process of the invention in the presence of hydrates of methane, the transport of fluids forming hydrates such as petroleum effluents was simulated: hydrate formation tests were carried out using a gas, water and condensate using the apparatus described below.

The apparatus comprised a 6 meter long circuit constituted by tubes with an internal diameter of 7.7 mm, a 2 liter reactor comprising an inlet and an outlet for gas, and an inlet and an outlet for the mixture of water, condensate and additive initially introduced. The reactor was such that the circuit could be put under pressure. Tubes with an analogous diameter to those in the circuit circulated fluids from the circuit to the reactor and vice versa, via a gear pump between the two. A sapphire cell integrated into the circuit allowed the circulating liquid, and thus any hydrates which formed, to be seen.

In order to determine the effectiveness of the additives of the invention, fluids (water, condensate, additive) were introduced into the reactor. The apparatus was then pressurised to 7 Mpa. Homogenisation of the liquids was assured by their circulation in the circuit and the reactor, then in the circuit alone. The pressure was kept constant by adding gas, and the temperature was rapidly reduced (10° C./min) from 17° C. to 8° C., corresponding to the chosen experimental temperature.

The principle of these tests was to determine the latency time preceding hydrate formation and the increase in the pressure drop recorded from their formation. The latency time, corresponding to the time measured between the start of the test (circulation of fluids at 17° C.) and detection of hydrate formation (exothermicity, large gas consumption). The test period varied from several minutes to several hours: a high performing additive inhibited hydrate formation, or maintained them in a dispersed state in the fluids, for several hours.

EXAMPLE 3 (comparative)

In this example, a fluid was used which was composed of 80% by volume of water and 20% of condensate. The condensate was essentially composed of a mixture of hydrocarbons containing 10 to 15 carbon atoms. The gas used comprised 98% by volume of methane and 2% of ethane.

Under these conditions, hydrate formation was observed 30 min after the start of the test, inducing a large increase in the pressure drop and immediate formation of a plug in the coil.

EXAMPLE 4 (comparative)

In this example, the method of Example 3 was used with the same fluid, the same gas and the same pressure, but 0.5% by weight with respect to the water of polyvinylpyrrolidone with a mass average molecular weight of 700000 was added to the circulating fluid.

Under these conditions, a latency time of 1 hour was observed, followed by immediate blocking of the coil.

EXAMPLE 5

In this example, the method of Example 3 was used with the same fluid, the same gas, and the same pressure, but 0.5% by weight with respect to the water of copolymer H3 was added to the circulating fluid. Under these conditions, no hydrate formation was observed over a period of more than 24 hours.

EXAMPLE 6

In this example, the method of Example 5 was used, using 0.5% by weight of copolymer H1 with respect to the water.

Under these conditions, a latency time of 3 h 30 was observed. Hydrate formation induced an increase in the pressure drop, and plug formation occurred after only one hour of circulating the suspension of hydrates.

EXAMPLE 7

Example 6 was repeated, using 0.5% by weight of copolymer H4. Under these conditions, a latency time of 5 hours was observed, and a plug formed in the lines 1 h 30 after formation.

We claim:

1. A process for inhibiting the formation, growth and/or aggregation of hydrates in a fluid comprising at least water and a gas, under thermodynamic conditions in which hydrates can form from the water and the gas, comprising incorporating into said fluid a water-soluble copolymer containing a hydrophobic unit, said copolymer having the structure:

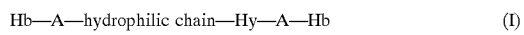

wherein the hydrophilic chain is constituted by a polyoxyalkylene chain which has the following overall formula:

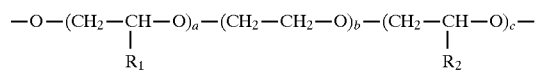

wherein $R_1$ and $R_2$ each represent a hydrogen atom or an alkyl radical containing 1 to 30 carbons atoms; each of a and c is an integer in the range of 0 to 50, b is less than or equal to 750, with (a+b+c) being non zero and b being sufficiently high for the copolymer to be water-soluble;

the hydrophobic groups (Hb) are alkyl, alkylaryl or cycloalkyl radicals; and the hydrophobic groups (Hb) are connected to the hydrophilic chain by —A—groups comprising at least one urethane function.

2. A process according to claim 1, wherein the hydrophobic units in the water-soluble copolymer represent 0.5% to 70% by weight of said copolymer.

3. A process according to claim 2, wherein said copolymer is incorporated into said fluid at a concentration of 0.05% to 5% by weight with respect to the water present.

4. A process according to claim 3, wherein said concentration is 0.25% to 2% by weight with respect to the water present.

5. A process according to claim 2, wherein in said fluid, said gas comprises at least one hydrocarbon selected from methane, ethane, ethylene, propane, propene, n-butane, isobutane, and optionally $H_2S$ and/or $CO_2$.

6. A process according to claim 1, wherein therefor in the copolymer with structure (I), the ethylene oxide concentration is at least 20% by weight.

7. A process according to claim 1, wherein in the copolymer with structure (I), A groups containing urethane functions have the form:

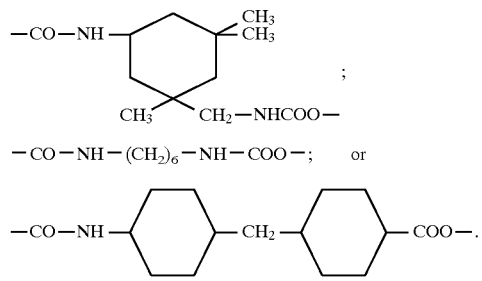

—CO—NH—(CH$_2$)$_6$—NH—COO—; or

8. A process according to claim 1, wherein in the copolymer with structure (I), the hydrophobic group is a nonylphenyl radical with the formula $C_9H_{19}C_6H_4$.

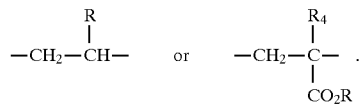

9. A process according to claim 1, wherein said copolymer is incorporated into said fluid at a concentration of 0.05% to 5% by weight with respect to the water present.

10. A process according to claim 9, wherein said concentration is 0.25% to 2% by weight with respect to the water present.

11. A process according to claim 1, wherein in said fluid, said gas comprises at least one hydrocarbon selected from methane, ethane, ethylene, propane, propene, n-butane, isobutane, and optionally $H_2S$ and/or $CO_2$.

12. A process according to claim 1, wherein said fluid comprises natural gas.

13. A process according to claim 1, wherein said fluid comprises petroleum gas and at least one liquid hydrocarbon.

14. A process for inhibiting the formation, growth and/or aggregation of hydrates in a fluid comprising at least water and a gas, under thermodynamic conditions in which hydrates can form from the water and the gas, comprising incorporating into said fluid a water-soluble copolymer containing a hydrophobic unit, said copolymer having the structure: (II) of the type (Hb)—(Hy) with a statistical distribution of hydrophilic (Hy) and hydrophobic (Hb) units, in which the hydrophilic units (Hy) have the general formula:

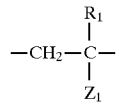

where $R_4$ represents a hydrogen atom or a methyl radical and $Z_1$ represents a —$CONH_2$ group; and the hydrophobic units (Hb) have the general formula:

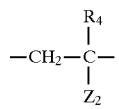

where $R_4$ represent a hydrogen atom or a methyl radical, $Z_2$ represents a $COR'_1$, $CONHR'_1$, or $CONR'_1R'_2$, where $R'_1$ and $R'_2$ each represent an alkyl radical containing 2 to 30 carbon atoms, or an aryl or alkylaryl group containing 6 to 30 carbon atoms.

15. A process according to claim 14, wherein the hydrophobic units in the water-soluble copolymer represent 0.5% to 70% by weight of said copolymer.

16. A process according to claim 14, wherein said fluid comprises natural gas.

17. A process according to claim 14, wherein said fluid comprises petroleum gas and at least one liquid hydrocarbon.

18. A process for inhibiting the formation, growth and/or aggregation of hydrates in a fluid comprising at least water and a gas, under thermodynamic conditions in which hydrates can form from the water and the gas, comprising incorporating into said fluid a water-soluble copolymer containing a hydrophobic units, said copolymer having the structure: (III) of type (Hb)—(Hy) with a statistical distribution of hydrophilic (Hy) and hydrophobic (Hb) units and with the following general formula:

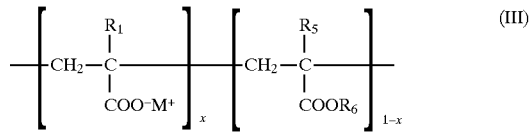

where $R_5$ represents a hydrogen atom or a methyl radical, $M^+$ represents a proton $H^+$ or an alkaline or ammonium cation, $R_6$ is an alkyl radical containing 2 to 6 carbon atoms and x is 0.4 to 0.8.

19. A process according to claim 18, wherein the hydrophobic units in the water-soluble copolymer represent 0.5% to 70% by weight of said copolymer.

20. A process according to claim 18, wherein said copolymer is incorporated into said fluid at a concentration of 0.05% to 5% by weight with respect to the water present.

21. A process according to claim 20, wherein said concentration is 0.25% to 2% by weight with respect to the water present.

22. A process according to claim 18, wherein in said fluid, said gas comprises at least one hydrocarbon selected from methane, ethane, ethylene, propane, propene, n-butane, isobutane, and optionally $H_2S$ and/or $CO_2$.

23. A process according to claim 18, wherein said fluid comprises natural gas.

24. A process according to claim 18, wherein said fluid comprises petroleum gas and at least one liquid hydrocarbon.

25. A process according to claim 18, wherein the hydrophobic units in the water-soluble copolymer represent 0.5% to 70% by weight of said copolymer.

26. A process for inhibiting the formation, growth and/or aggregation of hydrates in a fluid comprising at least water and a gas, under thermodynamic conditions in which hydrates can form from the water and the gas, comprising incorporating into said fluid a water-soluble copolymer containing a hydrophobic unit, said copolymer having the structure: (IV) of type (Hb)—(Hy) with a statistical distribution of hydrophilic (Hy) and hydrophobic (Hb) units and in which the hydrophilic units (Hy) have the following general formula:

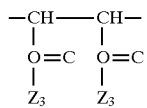

where $Z_3$ represents an OH group or a polyoxyethylene monoether chain; and the hydrophobic units have at least one of the following general formulae:

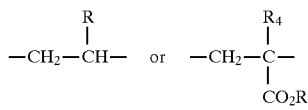

where R represents an alkyl hydrocarbon radical containing 1 to 30 carbon atoms and $R_4$ represents a hydrogen atom or a methyl radical.

27. A process according to claim 26, wherein said copolymer is incorporated into said fluid at a concentration of 0.05% to 5% by weight with respect to the water present.

28. A process according to claim 27, wherein said concentration is 0.25% to 2% by weight with respect to the water present.

29. A process according to claim 26, wherein in said fluid, said gas comprises at least one hydrocarbon selected from methane, ethane, ethylene, propane, propene, n-butane, isobutane, and optionally $H_2S$ and/or $CO_2$.

30. A process according to claim 26, wherein said fluid comprises natural gas.

31. A process according to claim 26, wherein said fluid comprises petroleum gas and at least one liquid hydrocarbon.

32. A process according to claim 26, wherein $Z_3$ represents $-O-(CH_2-CH_2-O)_m-CH_3$ wherein m is 6 to 10.

* * * * *